United States Patent Office 3,487,057
Patented Dec. 30, 1969

3,487,057
EASY PROCESSING NITRILE ELASTOMERS
Donald G. Frazer, Avon, Ohio, assignor to The B. F. Goodrich Company, New York, N.Y., a corporation of New York
No Drawing. Filed Oct. 4, 1967, Ser. No. 672,734
Int. Cl. C08d 3/02
U.S. Cl. 260—80.7
5 Claims

ABSTRACT OF THE DISCLOSURE

Easily processed nitrile containing elastomers are prepared by polymerizing monomer mixtures containing about 25 to about 50 parts by weight of methacrylonitrile, about 0.5 to about 1.5 parts of an alkylene glycol dimethacrylate and about 50 to about 75 parts of butadiene-1,3.

Background of the invention

Nitrile containing elastomers are particularly valuable in applications requiring heat resistance and resistance to attack by oil. The primary polymers used for such applications have been copolymers of butadiene-1,3 and acrylonitrile. While such copolymers have the desired physical properties they are often difficult to process and easier processing nitrile containing elastomers are desired.

Summary of the invention

It has now been found that elastomers prepared from monomer mixtures containing about 25 to about 50 percent of methacrylonitrile, about 0.5 to about 1.5 percent of an alkylene glycol dimethacrylate and the remainder butadiene-1,3, have greatly improved processing characteristics compared to copolymers of acrylonitrile and butadiene-1,3. Quite unexpectedly, it was also found that such methacrylonitrile polymers have better processing characteristics and greatly superior physical properties as tensile strength when compared to similar polymers prepared from monomer mixtures of acrylonitrile, alkylene glycol dimethacrylates and butadiene-1,3.

Detailed description

Methacrylonitrile is used in preparing the polymers of this invention, as monomers charged, in amounts of about 25 to about 50 weight parts per 100 weight parts of total monomers charged, preferably about 30 to 40 parts. Under normal reaction conditions and when reactions are conducted to 90% conversion or more, these preferred ratios normally provide, in the resulting copolymers about 30 to about 40 bound percent methacrylonitrile.

The second monomer used in preparing the copolymers of this invention is an alkylene glycol dimethacrylate having the formula

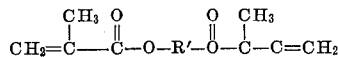

wherein R' is an alkylene radical containing 2 to 6 carbon atoms, preferably $(CH_2)_n$ wherein $n$ is a number from 2 to 4. Particularly useful is ethylene glycol dimethacrylate. The amount of this monomer employed is critical and while amounts from 0.5 to about 1.5 parts by weight per 100 of monomers may be used, it is preferred that amounts greater than 0.5 and less than 1.5, as about 0.75 to 1.25, are employed.

The third essential monomer of this copolymer is butadiene-1,3 and it normally will be used in amounts from about 50 to about 75 parts by weight per 100 parts of total monomers, more preferably about 60 to about 70 parts. It will be understood, of course, that small amounts, preferably less than 10 parts by weight of other vinylidene monomers containing a terminal $CH_2=C<$ group may be employed, so long as the essential characteristics of the copolymer are not altered, that is, that the improved processing advantages are not lost and that the other desirable physical properties as oil resistance, tensile strength and the like are not adversely affected.

The copolymers are readily prepared by methods well known to those skilled in the art, preferably in aqueous emulsions or dispersions at temperatures in the range of about −35° C. to about 95° C., preferably at 0° C. to 25° C.

Aqueous polymerization systems may include substantial amounts of emulsifiers or may be essentially free of emulsifiers by techniques known to those skilled in the art. Normally, an emulsifier system will be employed, with the emulsifier present in amounts from about 1 to 10 parts by weight. The emulsifiers employed include, for example, fatty acid soaps such as sodium and potassium laurate and oleate, rosin acid soaps including hydrogenated rosin acid soaps and disproportionated rosin acid soaps, sulfates and sulfonates such as sodium lauryl sulfate, the sodium salts of aromatic sulfonic acids, alkylaryl sulfonates and similar synthetic emulsifying agents. Likewise, the so-called cationic emulsifiers and non-ionic emulsifiers may be employed. Mixtures of emulsifiers are often advantageously used.

The catalysts employed for the polymerization reaction will be any of those free radical forming catalysts known to and used by those skilled in the art, which include alkali persulfates, peroxides, organic peroxides and hydroperoxides and the well-known redox systems. Particularly useful at lower temperatures are systems including an oxygen-containing component and a reducing component, for example, potassium persulfate with an organic reducing agent; organic peroxides and hydroperoxides with heavy metal compounds, as iron; sodium formaldehyde, sulfoxylate, an organic hydroperoxide and iron salts; and the like.

The usual modifying agents for polymerization reactions which normally are sulfur-containing materials as the alkyl mercaptans containing 10 to 18 carbon atoms, for example, dodecyl mercaptans and mixtures of tertiary $C_{12}$ mercaptans, may be used.

As is obvious, the method of polymerization, the emulsifier system and catalyst employed are not critical and the polymers may be made by any of the normal procedures employed by those skilled in the art to prepare nitrile containing elastomers.

While the polymerizations are normally conducted to greater than about 90% conversion of monomers to polymer, lower conversion polymers may be prepared, and in either event the usual short-stopping agents as hydroquinone may be added to terminate the polymerization and destroy the catalyst and any free radicals remaining in the system. The polymers are stabilized with the usual antioxidants such as the aryl amines or the non-staining phenol derivatives before or after separation of the rubber from the aqueous medium.

EXAMPLE

To demonstrate the preparation and advantages of the improved copolymer of this invention, two polymers were prepared in the following polymerization recipe at a reaction temperature of 5° C. The two nitriles are on an equimolar basis. The conversion of monomers to polymers in both polymerizations was greater than 90%. Equimolar amounts of methacrylonitrile and acrylonitrile were employed. The polymers were isolated from the resulting latex with salt-acid, washed and dried. The recipes are as follows. All components charged as parts by weight.

| Recipe | I | II |
|---|---|---|
| Water | 145 | 145 |
| Butadiene | 62 | 67 |
| Acrylonitrile | | 33 |
| Methacrylonitrile | 38 | |
| Rosin Soap 731 [1] | 4.6 | 4.6 |
| Ethylene glycol dimethacrylate | 1.0 | 1.0 |
| Daxad 15 [2] | 0.1 | 0.1 |
| Trisodium phosphate 12 H$_2$O | 0.5 | 0.5 |
| Versene [3] | 0.2 | 0.2 |
| tC$^{12}$ mercaptan | 0.35 | 0.35 |
| Dodecyl mercaptan [4] | 0.07 | 0.07 |
| Sesquetrene NaFe [5] | 0.006 | 0.006 |
| Sodium formaldehyde sulfoxylate | 0.0375 | 0.0375 |
| Cumene hydroperoxide | 0.03 | 0.03 |

[1] Disproportionated sodium soap of abietic acid.
[2] A sodium naphthalene sulfonate mixture.
[3] Tetrasodium ethylenediamine tetraacetate.
[4] After 50% conversion.
[5] Monosodiumferric ethylenediamine tetraacetate.

The polymers were stabilized with 2.5 parts of 4,4'-thiobis-6-t-butyl m-cresol antioxidant. Samples of the two polymers were milled, and the raw polymer mill shrinkage was determined as follows:

| | I (percent) | II (percent) |
|---|---|---|
| 3 minutes at 50° F | 9.35 | 14.6 |
| 10 minutes at 50° F | 8.35 | 13.6 |

The polymers were then compounded to the following recipe:

| | Parts |
|---|---|
| Polymer | 100.0 |
| Zinc oxide | 5.0 |
| Stearic acid | 1.0 |
| Philblack A[1] | 40.0 |
| Tetramethylthiuramdisulfide | 3.5 |

[1] Fast extrusion oil furnace black.

Samples of the compounded stock were tested for processability through the Garvey die with the following results:

| | I | II |
|---|---|---|
| Grams/minute | 36.5 | 26 |
| Inches/minute | 21.12 | 16.37 |

The improvement in processability of Polymer I of this invention is readily apparent from both the mill shrinkage and extrusion volume and rate.

The compounded polymers were then vulcanized at 338° F. for 5, 10 and 20 minutes. The following physical properties were obtained on the vulcanizates:

| | I | II |
|---|---|---|
| 100% Modulus: | | |
| 5 minutes | 400 | 480 |
| 10 minutes | 413 | 500 |
| 20 minutes | 400 | 483 |
| Ultimate tensile, p.s.i.: | | |
| 5 minutes | 2,280 | 1,575 |
| 10 minutes | 2,405 | 1,680 |
| 20 minutes | 2,436 | 1,631 |
| Ultimate elongation, percent: | | |
| 5 minutes | 400 | 300 |
| 10 minutes | 403 | 303 |
| 20 minutes | 393 | 280 |

The oil resistance in ASTM #1 oil was determined on 10 minute cures of Polymer I with the following results obtained:

ASTM #1 Oil (70 hours at 212° F.):
| | |
|---|---|
| Tensile p.s.i. | 2500 |
| Elongation percent | 360 |
| Percent volume change | —65 |
| 180° bend | Pass |

These methacrylonitrile elastomers find utility in applications where nitrile elastomers are normally used. The improved processing characteristics and desirable balance of physical properties offer advantages over the equivalent acrylonitrile polymers in making gaskets, wire coatings, seals and the like.

I claim:
1. An elastomer prepared by the free radical polymerization to greater than about 90% conversion of a monomer mixture consisting essentially of, in weight parts per 100 weight parts of total monomers charged, about 25 to 50 weight parts methacrylonitrile, about 0.5 to 1.5 weight parts of an alkylene glycol dimethacrylate, about 50 to 75 weight parts of butadiene-1,3, and less than 10 weight parts of other vinylidene monomers containing a terminal $CH_2=C<$ group.
2. The elastomer of claim 1 wherein the amount of methacrylonitrile is from about 30 to about 40 parts, the alkylene radical of the alkylene glycol dimethacrylate contains 2–6 carbon atoms and the amount is about 0.75 to about 1.25 parts and the amount of butadiene-1,3 is about 70 to about 60 parts.
3. The elastomer of claim 2 wherein the alkylene glycol dimethacrylate is ethylene glycol dimethacrylate.
4. The elastomer of claim 3 wherein the amount of ethylene glycol dimethacrylate is about 1 part, the methacrylonitrile is about 35 to 40 and the butadiene is about 64 to 59 parts, polymerized at a temperature of about 0° C. to 25° C.
5. The elastomer of claim 6 wherein the amount of bound methacrylonitrile is from about 30 to 40 parts.

References Cited
UNITED STATES PATENTS

| 2,384,570 | 9/1945 | Semon | 260—84.5 |
| 2,386,661 | 10/1945 | Clifford et al. | 260—84.5 |
| 2,807,602 | 9/1957 | Schnell et al. | 260—45.5 |
| 3,192,176 | 6/1965 | Mielke et al. | 260—29.7 |
| 3,356,659 | 12/1967 | Hagemeyer et al. | 260—80.7 |

JOSEPH L. SCHOFER, Primary Examiner

J. C. HAIGHT, Assistant Examiner

U.S. Cl. X.R.
260—80.6, 80.81